Jan. 30, 1962 R. KRAÜST ET AL 3,019,298

TELEPHONE CONNECTOR SWITCH OF THE RELAY TYPE

Filed March 13, 1957 2 Sheets-Sheet 1

Inventors.
Rudolf Kraüst &
Walter Strobelt.
By [signature] Atty.

Inventors.
Rudolf Kraüst &
Walter Strobelt.
By. [signature] Atty 3,019,298

TELEPHONE CONNECTOR SWITCH OF THE RELAY TYPE

Rudolf Kraüst and Walter Strobelt, Munich, Germany, assignors to Siemens & Halske Aktiengesellschaft Berlin and Munich, a corporation of Germany
Filed Mar. 13, 1957, Ser. No. 645,870
Claims priority, application Germany Mar. 17, 1956
10 Claims. (Cl. 179—18)

Figure 1:
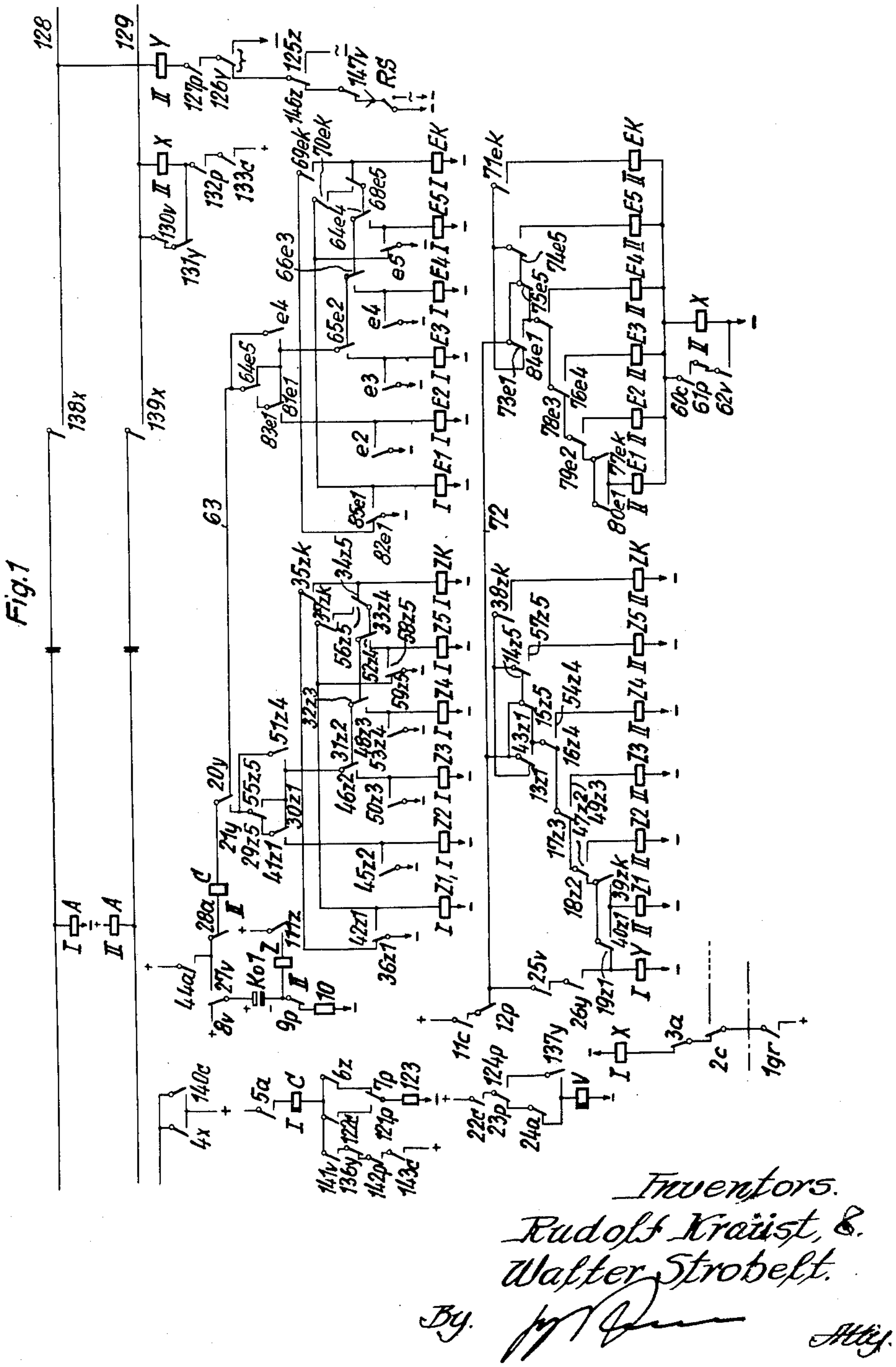

This invention relates to signaling systems and is particularly concerned with switching arrangements for telephone connector switches of the relay type.

In order to be able to select a given circuit from a plurality of circuits, there is already known an arrangement for communication and particularly telephone systems in which relays or magnets for actuating contacts of switches are connected in a different manner between two contact pyramids in order to effect various control operations.

In communication and particularly telephone systems employing relay switches, a desired subscriber's line is connected to the incoming connection path (the connector) directly by contacts of the tens and units relays to be controlled by the numerical selection. At least one of these relay groups consists of multi-contact relays.

In other known systems, a desired subscriber line is merely prepared for connection, as a function of the control of tens relay groups by the numerical selection. A relay of the corresponding subscriber line initiates the coupling with the incoming path over which the digit-relay groups were affected. Only the coupling relay which can connect the selected subscriber's line with the incoming connection path is connected. These systems require a marker.

The object of the present invention is to avoid the use of a special marker in connection with relay connectors cooperating with coupling relays specific to the lines. This object is realized by the provision of an energizing circuit for each coupling relay associated with a line, extending directly over serially connected contacts of two digit relay groups, wherein the relays of one group are affected by the tens digits and the relays of the other group by the units digits, and wherein each responding coupling relay closes the corresponding test circuit. The elimination of a special marker reduces the number of contacts necessary in connection with the digit relays affected by the dialed pulses and in connection with the control relays, for respectively preparing a selected line for connection or for connecting the relays which effect the coupling of the line.

In accordance with a further feature of the invention, each coupling relay is disposed in a bridge between two marking conductors, one of which is marked by the digits relay of the tens relay group corresponding to the tens digit of the called number, while the other marking conductor is marked by the digits relay of the units digit relay group corresponding to the units digit of the called number.

Each marking conductor to be marked by the digit relays of one group is connected over coupling relays with each of the marking conductors to be marked by the digit relays of the other group.

In accordance with still another feature of the invention, a particularly suitable arrangement which assures uniform loading of the contacts of the digit relays results by providing for each contact pyramid, which is formed of contacts of the relays of one digit relay group, a contact chain comprising $n—1$ normal contacts, and by connecting each coupling relay to be actuated over the contact pyramid by way of a make contact of the digit relay energized in each case after completion of the selection as well as by way of the normal contacts preceding the make contact in the contact pyramid.

The foregoing and other objects and features of the invention will appear from the description which will be rendered below with reference to the accompanying drawings.

Figure 2:
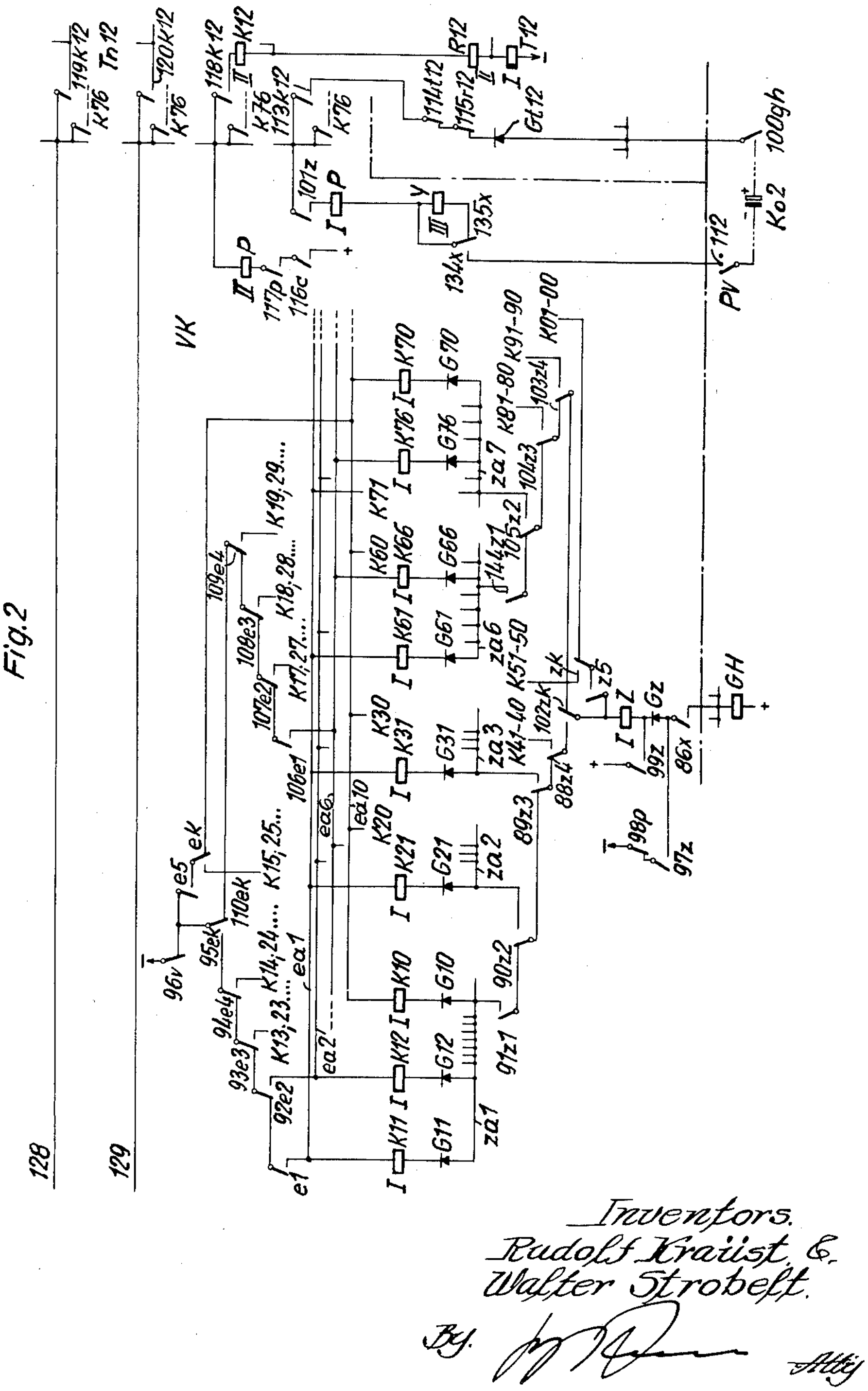

FIGS. 1 and 2 show an example of a connector according to the invention which has access to 100 subscriber lines.

In the embodiment shown in the drawings, each of the two digit relay groups, to be affected at the most by series of ten number impulses, consists of five digit relays and one switching relay. Upon the receipt of more than five impulses a corresponding number of digit relays is accordingly actuated twice.

In FIG. 1, there are shown the two relay groups each comprising six relays which are to be controlled by trains or series of impulses.

In FIG. 2, there is shown the connection coupler VK. The coupling relay of a selected subscriber's line is connected by way of two contact pyramids.

Only the switching means and circuits necessary for an understanding of the invention are shown. Windings and contacts of relays are contained partly in FIG. 1 and partly in FIG. 2.

I. *Seizure of the connector*

It shall be assumed that a calling subscriber line is to be connected, for example, by means of a line finder, not shown, operating in a well known manner, with the connector illustrated in the drawings. Responsive to the calling signal, the coupling relay of the line finder allotted to the calling line and the idle connection set, is energized by a group call relay, of an allotter, not shown, operating in a well known manner. At the same time, relay X (FIG. 1, lower left hand corner) is energized over its winding I in a circuit extending by way of contact 1*gr* of the group call relay of the allotter:

(1) +, 1*gr*, 2*c*, 3*a*, I X, —

Relay X closes, at contact 4*x*, a holding circuit extending over the incoming private conductor and the holding winding of the coupling relay of the calling line and its cutoff relay. Upon switching through of the line conductors, the line relay A is energized in the calling line loop circuit and connects relay C which is slow-to-release, in a circuit:

(2) +, 5*a*, I C, 6*z*, 7*p*, resistor 123, —

Relay C actuates its contacts to prepare for the setting of the connector. Among others, contact 140*c* which is in parallel to contact 4*x* is closed. Relay Y now energizes in a circuit:

(3) +, 11*c*, 12*p*, 13*z*1, 14*z*5, 15*z*5, 16*z*4, 17*z*3, 18*z*2, 19*z*1, I Y, —

By the opening of contact 20*y*, relay Y disconnects units relay EK, E1–E5 and connects, at the contact 21*y*, the tens relays ZK, Z1–Z5. The tens relays are controlled by the first series of impulses.

In the normal condition of the connector, the capacitor K*o*1 (FIG. 1; top left) is charged, in a circuit:

(4) +, 8*v*, K*o*1, 9*p*, 10, —

II. *Control of the tens relay group*

Upon actuation of the dial at the calling station, the line relay A is impulse-wise actuated. The first time it releases, control relay V (FIG. 1; lower left) which is slow-to-release is energized in a circuit:

(5) +, 22*c*, 23*p*, 24*a*, V, —

Relay V closes a holding circuit for the relay Y:

(6) +, 11*c*, 12*p*, 25*v*, 26*y*, I Y, —

All digit relays are caused to energize by a capacitor discharge pulse. By opening the contact 8*v* and closing the contact 27*v*, the relay ZK is energized, which relay remains energized for the duration of the first five impulses, in a circuit:

(7) —, 10, 9*p*, K*o*1, 27*v*, 28*a*, II C, 21*y*, 29*z*5, 30*z*1, 31*z*2, 32*z*3, 33*z*4, 34*z*5, I ZK, —

As contact 36*z*1 is still closed, the winding I ZK will be short-circuited at the contact 35*zk*. Contacts 37*zk*, 38*zk*, 39*zk* are furthermore closed. A holding circuit for the relay ZK and an energizing circuit for relay Z1 are prepared, namely:

(8) +, 11*c*, 12*p*, 13*z*1, 38*zk*, II ZK, —

(9) +, 11*c*, 12*p*, 13*z*1, 14*z*5, 15*z*5 16*z*4, 17*z*3, 18*z*2, 39*zk*, II Z1, —

Contacts 40*z*1, 41*z*1, 42*z*1 and 43*z*1 close; contacts 13*z*1, 19*z*1, 30*z*1 and 36*z*1 open. By each energization of the tens relays ZK, Z1–5 and also by each energization of the units relays EK, E1–E5, contacts in the corresponding contact pyramids shown in FIG. 2 are also actuated. These contacts will not be referred to in the description of the control of the two relay groups.

A holding circuit is prepared for the relay Z1, winding II:

(10)

$$+,\ 11c,\ 12p,\ \frac{43z1}{15z5},\ 16z4,\ 17z3,\ 18z2,\ \frac{40z1}{39zk},\ \text{II Z1},-$$

After completion of each pulse and re-energization of relay A, a charging circuit is prepared for the capacitor K*o*1:

(11) +, 44*a*, 27*v*, K*o*1, 9*p*, 10, —

Upon the second pulse, the tens relay Z2 energizes in a circuit:

(12) —, 10, 9*p*, K*o*1, 27*v*, 28*a*, II C, 21*y*, 29*z*5, 41*z*1, I Z2, —

Contacts 45*z*2, 46*z*2, 47*z*2 close; contacts 31*z*2 and 18*z*2 open. A holding circuit is prepared for relay Z2, at contact 47*z*2 including the winding II Z2. Upon the opening of contact 18*z*2, the holding circuit 10 is interrupted; relay Z1 releases with a certain delay.

Upon the third pulse, relay Z3 energizes:

(13) —, 10, 9*p*, K*o*1, 27*v*, 28*a*, II C, 21*y*, 29*z*5, 30*z*1, 46*z*2, I Z3, —

Contacts 48*z*3, 49*z*3, 50*z*3 close; contacts 17*z*3, 32*z*3 open. A holding circuit including winding II Z3 is prepared at the contact 49*z*3. The holding circuit including the winding II Z2 is opened at contact 17*z*3. Relay Z2 releases with a certain delay.

The fourth pulse actuates the relay Z4:

(14) —, 10, 9*p*, K*o*1, 27*v*, 28*a*, II C, 21*y*, 29*z*5, 30*z*1, 31*z*2, 48*z*3, I Z4, —

Contacts 51*z*4, 52*z*4, 53*z*4, 54*z*4 close. Contact 16*z*4 interrupts the holding circuit including the winding II of relay Z3. Relay Z3 releases delayed. Furthermore, contact 32*z*4 opens.

Upon receipt of the fifth pulse, relay Z5 energizes:

(15)

$$-,\ 10,\ 9p,\ Ko1,\ 27v,\ 28a,\ \text{II C},\ 21y,\ \frac{41z\,4}{29z5,\ 30z1},\ 31z2,\ 32z3,\ 52z4,\ I\ Z5,-$$

Contacts 55*z*5, 56*z*5, 57*z*5, 58*z*5 close. The holding circuit including the winding II Z5 extends over contacts 13*z*1 and 57*z*5. At contact 56*z*5, an energizing circuit for the relay Z1 is prepared. Contacts 29*z*5, 34*z*5, 14*z*5, 15*z*5, 59*z*5 open. Relay Z4 releases with a certain delay.

Relay Z1 energizes responsive to the sixth pulse:

(16) —, 10, 9*p*, K*o*1, 27*v*, 28*a*, II C, 21*y*, 55*z*5, 31*z*2, 32*z*3, 33*z*4, 56*z*5, 37*zk*, I Z, —

The holding circuits for the relays ZK (circuit 8) and Z5 are interrupted upon opening of contact 13*z*1. Both relays release with delay. The other *z*1 contacts are also actuated. The release of relay ZK marks in the tens contact pyramid that a connection is to be made within one of the decades 6 to 10.

Relays Z2 to Z5 are successively energized responsive to the 7th to 10th pulses. The previously described applicable operations are repeated.

It will be seen that upon selection of one of the digits 1 to 5, the relay ZK and the corresponding Z relay are energized, while only one of the relays Z1 to Z5 will be energized upon selection of one of the digits 6 to 0.

Relay A remains actuated for an interval after completion of the impulsing, allowing the control relay V to release. At contact 25*v*, relay V opens the holding circuit (6) for the relay Y, which releases, opening contact 21*y* and thereby disconnecting the windings I of the tens relays ZK, Z1–Z5. At contact 20*y*, the control for the units relays EK, E1–E5 is prepared.

III. *Control of the units relay group*

Upon receipt of the first pulse of units pulse series, control relay V again energizes in the circuit (5). The winding II of relay X is short-circuited over contacts 60*c*, 61*p* and 62*v*, thereby preventing energization of the relay X during the receipt of the unit pulses.

The circuit of the units relay group corresponds substantially to the circuit of the tens relay group. Therefore, there will be described merely the connection of the relays EK and E1 responsive to the first units pulse. Relay EK energizes in a circuit:

(17) —, 10, 9*p*, K*o*1, 27*v*, 28*a*, II C, 20*y*, 63, 64*e*5, 65*e*2, 66*e*3, 67*e*4, 68*e*5 I EK, —

Relay EK closes contacts 69*ek*, 70*ek*, 71*ek* and 77*ek*. A holding circuit is prepared for relay EK, which remains energized upon the selection of the units relays 1 to 5, such holding circuit extending:

(18) +, 11*c*, 12*p*, 72, 73*e*1, 71*ek*, II EK, 60*c*, 61*p*, 62*v*, —

The relay E1 energizes:

(19) +, 11*c*, 12*p*, 72, 73*e*1, 74*e*5, 75*e*5, 76*e*4, 78*e*3, 79*e*2, 77*ek*, II E1, 60*c*, 61*p*, 62*v*, —

At contact 80*e*1, contact 77*ek* is bridged; contacts 73*e*1, 81*e*1, 82*e*1 are opened and contacts 83*e*1, 84*e*1, and 85*e*1 close. Upon receipt of the 2nd to 5th units pulse, relays E2 to E5 energize one after the other. Upon receipt of the 6th pulse, relay E1 energizes, whereupon relay EK releases. The 7th to 10th pulses actuate, one after the other, relays E2 to E5.

Upon cessation of impulse transmission, relay V releases. By opening the short-circuit of winding II of relay X, the latter relay is connected into the holding circuit of the energized units relay and energizes.

IV. *Connection of the coupling relay of the selected called line*

It shall be assumed that number "12" has been dialed; accordingly, relays ZK, Z1, EK and E2 have been energized.

After the energization of relay X, an energizing circuit is prepared for coupling relay K12:

(20) +, common relay GH, 86*x*, G*z*, I Z, 102*zk*, 88*z*4, 89*z*3, 90*z*2, 91*z*1, *za*1, G12, I K12, 92*e*2, 93*e*3, 94*e*4, 95*ek*, 96*v*, —

The coupling relay K12 is disposed in a bridge between the marker conductor *za*1 of the first tens group and *ea*2 of the second units group. The marker conductor *ea*2 is common to all coupling relays of the lines with the units digit 2.

Relays GH, Z and K12 energize. Relay Z closes a holding circuit for relay GH:

(21) +, GH, 86*x*, 97*z*, 98*p*, —

Furthermore, at contact 99*z*, relay Z places plus-potential directly on its winding. Relay Z closes a holding circuit for itself:

(22) (FIG. 1) +, 111*z*, II Z, 9*p*, 10, —

The test relay P (FIG. 2, right end) is prepared at contacts 100 *gh* and 101*z*.

If instead of the subscriber's number "12," the subscriber's number "76" is dialed, relays Z2 and E1 being actuated, the energizing circuit for the coupling relay K76 will extend over the following path:

(23) +, GH, 86*x*, G*z*, I Z, 102*zk*, 103*z*4, 104*z*3, 105*z*2, *za*7, G76, I K76, *ea*6, 106*e*1, 107*e*2, 108*e*3, 109*e*4, 110*ek*, 96*v*, —

In this circuit, the coupling relay K76 energizes in addition to the relays GH and Z.

V. *Testing the called line and switching through*

The further description is based on extending a connection to the subscriber line T*n*12 (top right end of FIG. 2).

There is provided a test distributor PV, shown diagrammatically as a selector, which prevents the simultaneous testing over several connecting couplers VK and thus the connecting together of two calling lines with the same called subscriber line if the same number should have been called over two connectors. If the wiper of the test distributor PV engages contact 112, to which the conductor to the test relay P of the connection coupler shown is connected, relay P will energize if the subscriber line is idle:

(24) K*o*2 —, PV, 112, 134*x*, I P, 101*z*, 113*k*12, 114*t*12, 115*r*12, G*t*12, 100*gh*, + K*o*2

Test relay P closes a holding circuit over its own winding II, the winding II of the coupling relay K12 and one winding each of the ringing relay R12 and the cutoff relay T12:

(25) +, 116*c*, 117*p*, II P, 118*k*12, II K12, II R12, I T12, —

At the contacts 115*r*12 and 114*t*12, circuit (24) is interrupted. At contacts 119*k*12 and 120*k*12, the line conductors of the called subscriber line T*n*12 are connected to the line conductors 128, 129 of the connector. At contact 12*p*, the holding circuits are interrupted over the relays ZK, Z1, EK, E2 and X (FIG. 1) and these relays release. After the opening of contact 9*p*, relay Z in the discharge circuit of the capacitor K*o*1 remains (FIG. 1) energized for a predetermined interval in order to assure the transmission of the first ring:

(26) (FIG. 1) +, 111*z*, II Z, K*o*1, 8*v*, +

By opening contact 7*p* and closing contact 121*p*, a new circuit for relay C is produced:

(27) —, 5*a*, I C, 122*c*, 121*p*, 123, —

Upon opening of contact 23*p* and closing contact 124*p*, a circuit is prepared for relay V, which will subsequently be closed.

During the release interval of relay Z, the first ring is transmitted:

(28) —, A.C. source, 125*z*, 126*y*, 127*p*, II Y, 128, 119*k*12, ringer at the called station, 120*k*12, 129, 130*v*, 131*y*, 132*p*, 133*c*, +

After release of relay Z, further ringing is effected over contacts 146*z* and 147*v* from a ringing interrupter RS which applies current at intervals of 5 or 10 seconds. Relay Y cannot respond to the ringing current since its winding III (FIG. 2; right) is short-circuited at contact 135*x*.

When the called party answers, relay Y, winding II, energizes over the called subscriber's loop. It opens at contact 131*y* the short-circuit of winding II X (FIG. 1; top right) and by opening contact 136*y* prevents a premature short circuit of relay C and connects at contact 137*y* a circuit for relay V. Relay X connected in the battery feed circuit of the called subscriber after the opening of contact 131*y*, switches the line conductors through at contacts 138*x* and 139*x*. The two subscribers are now connected with each other.

Contact 98*p* of the test relay P opens upon energization thereof and interrupts the holding circuit (21). The common relay GH restores. After the opening of contact 98*p*, the energizing circuit for the coupling relay of the selected line is closed at another connector, the digit relay groups of which have been affected by selection of a subscriber's number.

VI. *Release of the connection*

The subscriber, who first hangs up, effects release of the connection and restoration of the connector and associated connection coupler VK.

If the calling subscriber hangs up first, relay C is disconnected at contact 5*a* and by opening contact 116*c* opens the holding circuit for the windings II *p*, II K12, II R12, I T12 causing these relays to restore. Thereupon relays X and Y also restore since the battery feed circuit is interrupted at contacts 119*k*12, 120*k*12 and 127*p*, 132*p*. After release of relay X, contacts 4*x* and 140*c*, which are in parallel, open and interrupt the circuit over the incoming private conductor. The relays controlled over this conductor, coupling relays, as well as ringing and cutoff relays of the calling line, deenergize. At the called subscriber line, the intercept condition is produced in known manner and subsequently eliminated upon the hanging up of the receiver.

If the called subscriber hangs up first, then after the release of relay Y, relay C is short-circuited, during the release time of relay V, disconnected at contact 137*y*, over the series contacts 141*v*, 136*y*, 142*p*, 143*c*, and restores effecting the release of the connector. If the calling subscriber has not yet hung up, the intercept condition is produced at his line after the opening of the contacts 4*x* and 140*c*.

VII. *Busy testing of the called line*

If the called line is busy, both contacts 114*t*12 and 115*r*12 or one of them are open and circuit (24) is accordingly not completed. Since relay P remains normal and does not produce at contact 121*p* the circuit (27) for relay C, the latter restores after expiration of the testing interval since contact 6*z* is open. By returning its contacts into the normal position, all relays of the connector are disconnected. The intercept condition is produced at the calling subscriber line and the busy signal is connected.

It will be seen from the foregoing explanations that the coupling relays such as K11 . . . K70 shown in FIG. 2 constitute a single relay group for effecting the connection of subscriber lines, the coupling relays in this group being selectively controlled by relays shown in FIG. 1 constituting a counting chain which is controlled by the tens and units digit pulses transmitted from calling stations in extending calls to desired called stations.

Changes may be made within the scope and spirit of the appended claims.

We claim:

1. A telephone connector switch of the relay type comprising, in combination, a single group including a plurality of coupling relays, each coupling relay assigned to one of a plurality of subscriber lines accessible to the connector, each coupling relay operative to effect connection of the subscriber line to which it is assigned when such line is involved as a called line in the extension of a call from a calling line, a counting chain for selectively controlling the operation of said coupling relays, said counting chain comprising a plurality of tens digit relays, which are operatively governed by tens digit pulses transmitted from a calling subscriber line and a plurality of units digit relays which are operatively governed by units digits pulses transmitted from said calling line, circuit means including contacts controlled by said tens and units digit relays responsive to digit pulses received thereby from a calling line for energizing the coupling relay which is assigned to the desired called line identified by said digit pulses, contact means actuated by the energized coupling relay for connecting the desired called line to the connector, a test circuit for ascertaining the idle or busy condition of the called line, and contact means controlled by the energized coupling relay for closing said test circuit.

2. A connector switch according to claim 1, comprising two marking conductors which are respectively controlled by said tens and units digit relays, and circuit means for disposing each coupling relay in a bridge between said marking conductors.

3. A connector switch according to claim 2, comprising means including said coupling relays for connecting the marking conductor which is under the control of said tens digit relays with the marking conductor which is under the control of said units digit relays.

4. A connector switch according to claim 3, comprising a contact pyramid formed by make contacts of said tens and units digit relays and comprising a contact chain including a plurality of normal contacts, and circuit means for operatively connecting each coupling relay governed by said contact pyramid by way of a make contact controlled by the respectively energized digit relay disposed in series with the normal contacts located in said contact pyramid ahead of such make contact.

5. A connector switch according to claim 4, wherein the number of circuits to be operatively controlled exceeds the number of digit relays governing a contact pyramid, comprising two contact chains for each contact pyramid, and a switching relay for preparing the contact chain for the operative actuation thereof.

6. A connector switch according to claim 4, comprising means controlled by each coupling relay governed by the contact pyramids of both tens and units digit relays for preparing the test circuit, and means for inhibiting simultaneous closure of the test circuit in more than one connector.

7. A connector switch according to claim 1, comprising a control relay and a holding circuit therefor, means governed by the units digits relays for actuating said control relay in a holding circuit, common switching means, and means controlled by said control relay for connecting said test circuit to said common switching means.

8. A connector switch according to claim 7, comprising means for seizing said connector switch to extend a call, means for temporarily actuating said control relay upon seizure of said connector, and contact means controlled by said control relay for closing a point in said seizure circuit.

9. A connector switch according to claim 7, comprising means forming a battery feed circuit for the called line, a second control relay having a winding connected to said battery feed circuit, a further relay having a winding connected in said battery feed circuit, means for ringing the called line, and contact means controlled by said second control relay for short-circuiting another winding of said further relay to prevent actuation thereof during ringing of the called line.

10. An arrangement and cooperation of parts, according to claim 9, comprising contact means governed by said second control relay for switching the line conductors through to the called line.

References Cited in the file of this patent

UNITED STATES PATENTS 2,552,792 Jones ---------------- May 15, 1951